United States Patent
Batarseh

(10) Patent No.: US 12,546,190 B2
(45) Date of Patent: Feb. 10, 2026

(54) HOT WATER INJECTION/STIMULATION WITH ENABLERS

(71) Applicant: SAUDI ARABIAN OIL COMPANY, Dhahran (SA)

(72) Inventor: Sameeh Issa Batarseh, Dhahran Hills (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/169,105

(22) Filed: Apr. 3, 2025

(65) Prior Publication Data
US 2025/0257630 A1      Aug. 14, 2025

Related U.S. Application Data

(62) Division of application No. 17/816,121, filed on Jul. 29, 2022, now Pat. No. 12,338,714.

(51) Int. Cl.
*E21B 36/04*       (2006.01)
*F24H 1/10*        (2022.01)

(52) U.S. Cl.
CPC .............. *E21B 36/04* (2013.01); *F24H 1/101* (2013.01); *F24H 2250/00* (2013.01)

(58) Field of Classification Search
CPC ....................................................... E21B 43/26
See application file for complete search history.

(56) References Cited

U.S. PATENT DOCUMENTS

2022/0112772 A1 * 4/2022 ALshunaifi ............... E21B 7/15

* cited by examiner

*Primary Examiner* — William D Hutton, Jr.
*Assistant Examiner* — Avi T Skaist
(74) *Attorney, Agent, or Firm* — Osha Bergman Watanabe & Burton LLP

(57) ABSTRACT

A laser tool system, which includes an optical fiber having an input end and an output end and a laser tool body, is described. The output end of the optical fiber may be optically connected to a laser source. The laser tool body may include a laser head optically connected to the laser output end, an activating chamber connected to the laser head, a heat transfer agent, an exit port, a nozzle connected to the exit port, and a fluid conduit. The fluid conduit may deliver a fluid into contact with the heat transfer agent. Methods for heating an aqueous fluid and heating a fluid in a reservoir are also described. The methods may include irradiating a heat transfer agent to provide an irradiated heat transfer agent, providing a fluid, and contacting the irradiated heat transfer agent with the fluid, thereby heating the fluid and forming a heated fluid mixture.

12 Claims, 8 Drawing Sheets

HOT WATER INJECTION/STIMULATION WITH ENABLERS

CROSS REFERENCE TO RELATED APPLICATIONS

This Application is a Division of U.S. application Ser. No. 17/816,121 filed on Jul. 29, 2022. The entire contents of this application are incorporated herein by reference in its entirety.

BACKGROUND

Wellbore stimulation is a branch of petroleum engineering focused on ways to enhance the flow of hydrocarbons from a formation to the wellbore for production. To produce hydrocarbons from the targeted formation, the hydrocarbons in the formation need to flow from the formation to the wellbore then to the surface. The flow from the formation to the wellbore may depend on formation permeability. When formation permeability is low, stimulation is applied to enhance the flow. Stimulation can be applied in the wellbore and into the formation to build a network in the formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a laser tool configured to operate in a reservoir, the laser tool includes an optical fiber having an input end and an output end and a laser tool body. The output end of the optical fiber may be optically connected to a laser source. The laser tool body may include a laser head optically connected to the laser output end, an activating chamber connected to the laser head, a heat transfer agent, an exit pot, a nozzle connected to the exit port, and a fluid conduit. The fluid conduit may be configured to deliver a fluid into contact with the heat transfer agent.

In another aspect, embodiments disclosed herein relate to a method for heating an aqueous fluid via a laser tool treatment. The method may include irradiating a heat transfer agent in an activating chamber of a laser tool to provide an irradiated heat transfer agent, purging the irradiated heat transfer agent from the activating chamber, providing an aqueous fluid, and contacting the irradiated heat transfer agent with the aqueous fluid, thereby heating the aqueous fluid and forming a heated fluid mixture.

In another aspect, embodiments disclosed herein relate to a laser tool treatment method for heating a fluid in a reservoir. The method may include inserting the laser tool into a reservoir, advancing the laser tool to a target area of the reservoir, irradiating a heat transfer agent in an activating chamber of the laser tool, purging the irradiated heat transfer agent from the activating chamber, providing the fluid, contacting the irradiated heat transfer agent with the fluid, thereby heating the fluid and forming a heated fluid mixture, discharging the heated fluid mixture on the target area of the reservoir via a nozzle of the laser tool, and stimulating the target area of the reservoir with the heated fluid mixture.

Other aspects and advantages of the claimed subject matter will be apparent from the following description and the appended claims.

In the figures, down is toward or at the bottom and up is toward or at the top of the figure. "Up" and "down" are generally oriented relative to a local vertical direction. However, as used throughout this disclosure, the terms "upflow" and "downflow" may refer to a position relative to the general direction of process or fluid flow, with upflow indicating a direction or position closer to start of the process and downflow referring to the direction or position closer to the end of the process. One of ordinary skill in the art would readily understand that an object or a process may be upflow or downflow of another object or process while having no general relation to the position relative to vertical orientation unless otherwise specifically stated.

DETAILED DESCRIPTION

Hot aqueous fluid injection is used for oil recovery and stimulation, to clean up a wellbore of a hydrocarbon bearing reservoir, and to mobilize heavy oil. However, the hot aqueous fluid often loses thermal energy, such as heat, when injected from a heating system to a targeted treatment area, such as in an oil and gas reservoir.

In order to maintain and/or increase the temperature of injection fluids, embodiments of this disclosure provide systems and methods for delivery of hot aqueous fluids. The delivery of hot aqueous fluids may include a laser tool system treatment to deliver hot aqueous fluids to a targeted area. The systems and methods of one or more embodiments include a laser tool system to irradiate an enabling material (or "enabler"), such as a heat transfer agent, with energy from a laser. The irradiated heat transfer agent may be introduced to a fluid to maintain and/or increase the temperature of the fluid and form a heated fluid mixture. The injection of a heated fluid mixture to the target area may stimulate the targeted treatment area of a reservoir to enhance oil recovery, provide cleanup of a wellbore, provide cleanup of a stuck tool, mobilize heavy oil and heavy oil residue, or combinations thereof.

Laser Tool System

Figure 1:
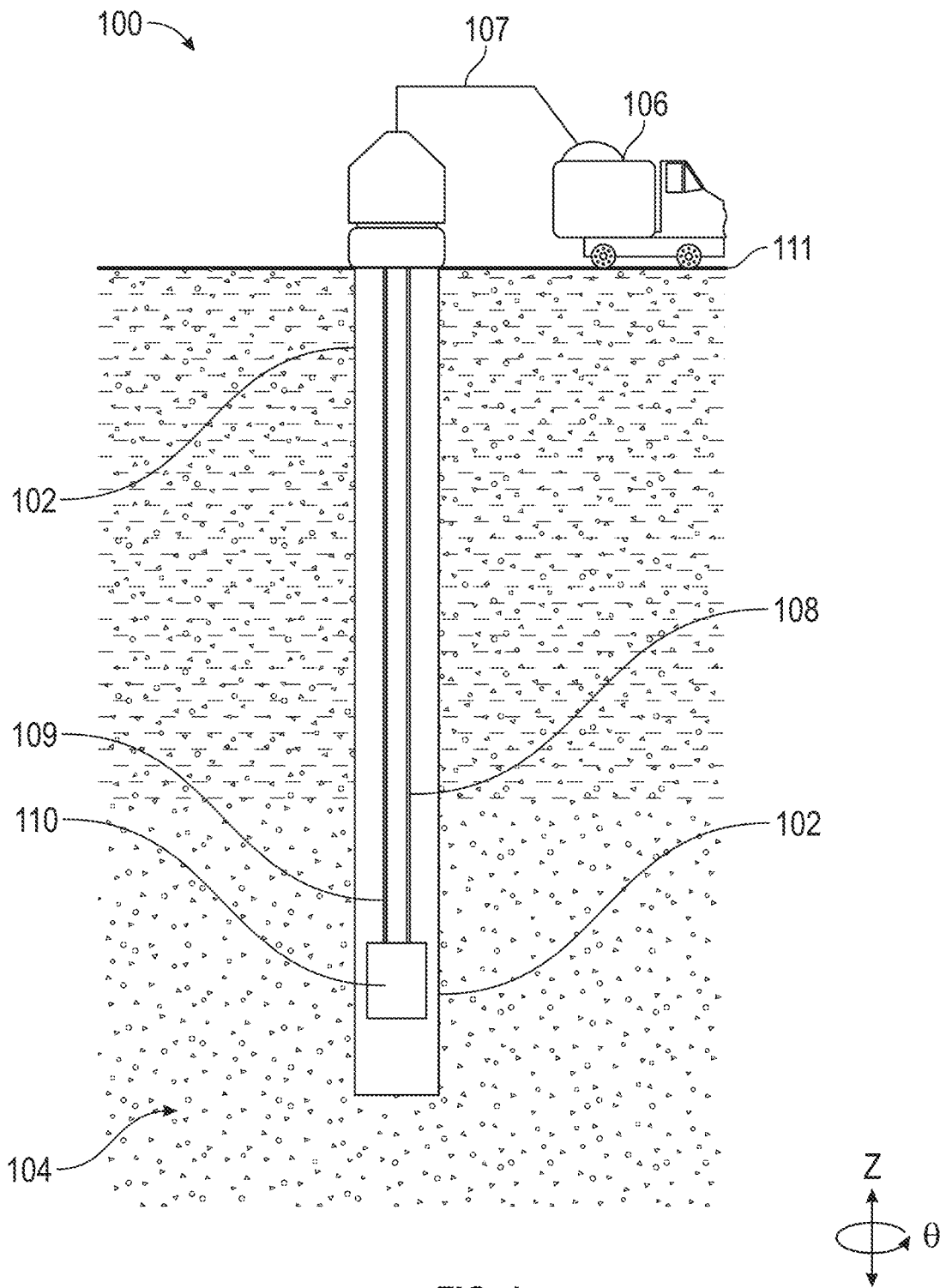
FIG. 1 is a schematic of a laser tool system of one of more embodiments located in a wellbore of a reservoir in accordance with one or more embodiments.

A laser tool system of one or more embodiments may be used to discharge a hot fluid. The discharging the heated fluid may include enhancing oil recovery, providing cleanup of a wellbore, providing cleanup of a stuck tool, mobilizing heavy oil and heavy oil residue, or combinations thereof. A non-limiting example for use of a laser tool system is shown in FIG. 1, which displays a laser tool system 100 of one of more embodiments located in a wellbore 102 of a reservoir 104. The laser tool system 100 may also include laser source 106 connected to optical fiber 108 that ends with a laser tool body 110. A laser energy emitted from a laser may be generated in laser source 106 and delivered to the laser tool body 110 via optical fiber 108. The optical fiber 108 may have an input end 107 and an output end 109. The input end 107 of the optical fiber may be in electrical communication with the laser source 106. The output end 109 of the optical fiber may be in electrical communication with one or more components of the laser tool. The laser tool system 100 may include a surface control unit (not shown).

The laser source 106 may be configured at a surface location 111 of the reservoir 104, on the laser tool body, or in the reservoir. The laser source 106 may generate a high power laser irradiation (for example, a laser having an output power of at least about 1 kW, at least about 10 kW, at least about 20 kW, at least about 100 kW, or in the megawatt range). Optical fiber 108 may be a fiber optic cable configured to transmit the high power laser irradiation. Optical fiber 108 may transmit laser energy inside the laser tool body 110. Given the depth of wellbore 102, optical fiber 108 may be many kilometers (km) long, such as about 1 km, about 5 km, about 20 km, or greater.

Since wellbores of reservoirs are frequently not vertical (as in horizontal drilling), a z-direction may be parallel to the downhole direction in a region of wellbore near a laser tool system. The spherical coordinates reference axis depicted here also includes theta Θ, the azimuthal angle perpendicular to the z-direction. While laser tool body 210 is depicted as a cylinder in FIG. 2, one having skill in the art will appreciate that the laser tool body 210 may have any shape, including a cube, a rectangular prism, a cuboid, or a hexagonal prism.

Figure 2:
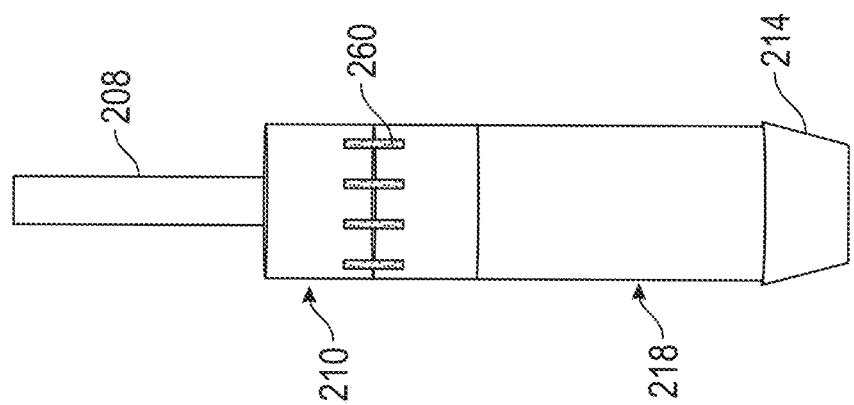
FIG. 2 is a schematic a laser tool body in accordance with one or more embodiments.

FIG. 2 depicts a laser tool body in accordance with one or more embodiments. The laser tool body 210 may include an alignment system 260, an activating chamber 218, and a nozzle 214. As mentioned above, the output end of an optical fiber 208 may be electrically connected to the laser tool body 210.

The alignment system 260 may manipulate the laser tool body 210 within the depicted x-y-z coordinate space. As wellbores are frequently not vertical (as in horizontal wellbores), and the laser tool system may be used in other applications, the z-direction may be defined as parallel to the downhole direction in a region near the laser tool body 210. In one or more embodiments, the alignment system 260 manipulates the laser tool body 210 in xyz space (meaning movement in the x, the y, and the z directions). In one or more embodiments, the alignment system 260 manipulates the laser tool body 210 in x-y space, while manipulation in the z direction is performed using alternative means (such as by advancing/retracting the laser tool body 210 within a wellbore using equipment known in the art). In one or more embodiments, the laser tool body 210 is grossly manipulated in the z-direction with alternative means and finely manipulated in the z-direction using the alignment system 260. One having skill in the art will appreciate the well-known structures that may be included in the alignment system 260, such as a combination of joint(s) and micromotor(s).

One having skill in the art will also appreciate how an articulation module, a rotational module, or both may be readily incorporated into any laser tool system or laser tool body of this disclosure. A laser tool system according to one or more embodiments includes an articulation module, a rotational module, or both such that a laser tool body may be rotated by rotational module and articulated in x-y or x-y-z space by articulation module.

The laser tool body may include a plurality of components to discharge a heated fluid. Non-limiting examples are shown in FIGS. 3A and 3B, which depict a cross section of the laser tool body shown in FIG. 2 in accordance with one or more embodiments.

Figure 3B:
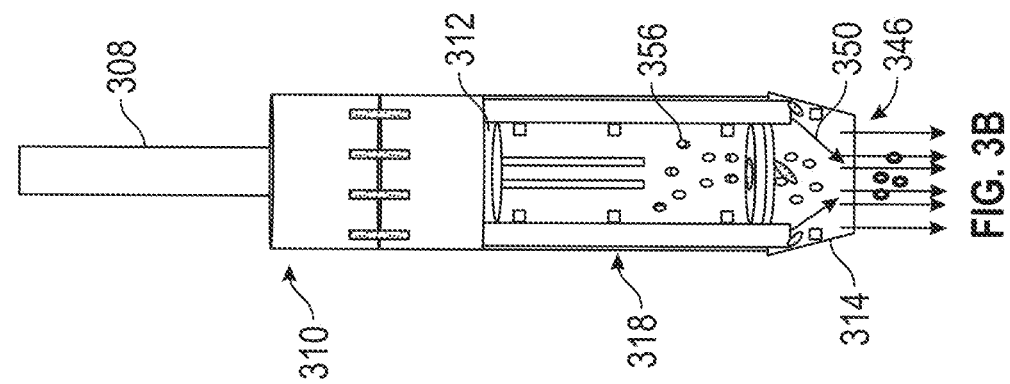
FIG. 3B is a schematic of a cross section of the laser tool body of FIG. 2 for the release of the heat transfer agent from the activating chamber in accordance with one or more embodiments.
Figure 3A:
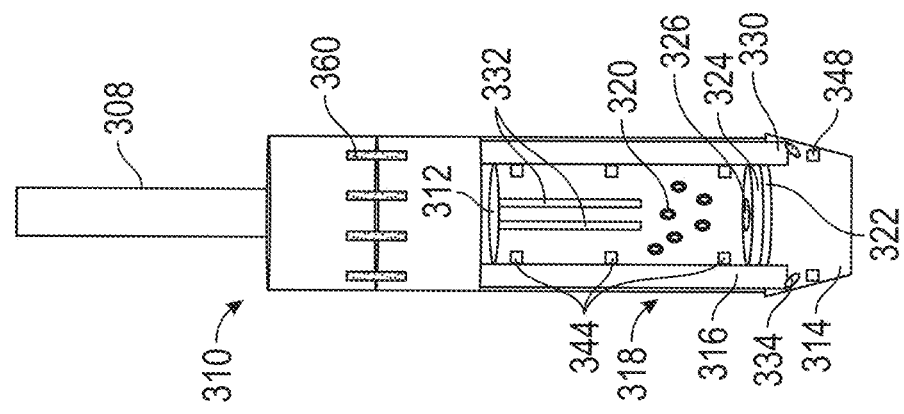
FIG. 3A is a schematic of a cross section of the laser tool body of FIG. 2 in accordance with one or more embodiments.

As shown in FIGS. 3A and 3B, the laser tool body 310 may include a laser head 312, a nozzle 314, a fluid conduit 316, an activating chamber 318, and an alignment system 360. In one or more embodiments, the output end of the optical fiber 308 is in electrical communication with the laser head 312. In FIGS. 3A and 3B, the nozzle 314 and the laser head 312 are on opposing sides of the laser tool body 310 such that an angle between the nozzle 314 and the laser head 312 is approximately 180°.

Within a laser head 312 of one or more embodiments, the laser energy encounters one or more optical components known in the art. These optical components may direct or shape the laser. These optical components may include one or more transmissive components (for example, lenses, filters, windows, optical flats, prisms, polarizers, beam splitters, wave plates, and additional optical fibers) or reflective components (for example, mirrors and retroreflectors). In one or more embodiments, the laser energy may pass through one or more lenses within the laser head 312 to control the size and direction of the laser energy before or during emission from laser head 312.

In one or more embodiments, the laser energy emitted from laser head 312 is focused or collimated, depending upon the application. In one or more embodiments, the laser energy emitted from laser head 312 is collimated. The laser energy emitted from laser head 312 may be configured to a diameter of the activating chamber 318, such that the entirety of the activating chamber 318 is irradiated with the laser energy.

In one or more embodiments, the activating chamber of a laser tool body includes a heat transfer agent 320 and an exit port 322 as shown in FIGS. 3A and 3B. The heat transfer agent 320 may be heated via the laser energy irradiated from a laser head 312 to form an irradiated heat transfer agent in the activating chamber 318. The heat transfer agent 320 may be loaded in the activating chamber 318 prior to treating a target area. In one or more embodiments, the heat transfer agent 320 is loaded in the activating chamber 318 prior to introducing a laser tool system to a wellbore. The heat transfer agent 320 may be loaded in the activating chamber 318 or in a component proximate to the activating chamber 318, such as within an adjacent or nearby sub in fluid communication with the activating chamber, prior to introducing the laser tool system into a wellbore.

In one or more embodiments, the heat transfer agent is stored at a surface location and delivered to the laser tool body. The laser tool system may include a heat transfer agent conduit (not shown). The heat transfer agent conduit may include a heat transfer agent inlet connected to a heat transfer agent source at the surface location and a heat transfer agent outlet fluidly connected to the activating chamber. The heat transfer agent conduit, thus, may connect heat transfer agent source to activating chamber so activating agent may be ejected from nozzle. Those skilled in the art may appreciate that the heat transfer agent may be delivered to the activating chamber with a transport material, such as a transport fluid, a transport gas, a transport foam, among other materials.

In the laser tool body 310 as depicted in FIGS. 3A and 3B, the heat transfer agent 320 may be stored in the activating chamber 318. The amount of the heat transfer agent 320 stored in the activating chamber 318 of the laser tool body 310 may depend on an amount of a fluid to be injected.

In one or more embodiments, the heat transfer agent 320 has a dark color, a high porosity, a high surface area, a small particle size, a high optical absorption, a low optical reflectivity, or combinations thereof. In one or more embodiments, the heat transfer agent 320 is a solid or a liquid. In one or more embodiments, the heat transfer agent may be activated carbon, graphite, carbon black, carbon nanotubes, nanoparticles, paint, dye, molybdenum disulfide, a transition metal chalcogenide, a metamaterial, a treated clay, a ceramic material, or combinations thereof.

The heat transfer agent 320 may absorb a laser energy emitted by the laser head 312 of the laser tool body 310, such that the heat transfer agent is irradiated. The laser energy absorbed by the irradiated heat transfer agent, may be stored in the irradiated heat transfer agent as thermal energy (or "heat"). The irradiated heat transfer agent may be a heated heat transfer agent.

In one or more embodiments, the temperature to which the irradiated heat transfer agent is heated depends on the laser energy duration and power emitted from a laser head. A non-limiting example includes irradiating a heat transfer agent, such as activated carbon, with a power of about 2 kW and a laser beam size of about 2 inches for three minutes. The temperature of the irradiated heat transfer agent may reach 800 degrees Celsius (° C.). In one or more embodiments, the temperature to which the irradiated heat transfer agent is heated may be in a range with an upper limit of about 300° C., about 350° C., about 400° C., about 450° C., about 500° C., about 550° C., about 600° C., about 650° C., about 700° C., about 800° C., and about 900° C. with an upper limit of one of about 700° C., about 750° C., about 800° C., about 850° C., about 900° C., about 950° C., about 1000° C., about 1100° C., and about 1200° C. The temperature to which an irradiated heat transfer agent is heated may be determined prior to introducing a laser tool of one or more embodiments to a wellbore.

In one or more embodiments, the activating chamber 318 includes at least one temperature sensor. In one or more embodiments, the activating chamber 318 includes a plurality of temperature sensors 344. The plurality of temperature sensors 344 may be included throughout the activating chamber 318 to transmit a temperature in close proximity to a laser head, to measure a temperature of a location in the activating chamber 318 that may indicate back reflection of laser energy, or combinations thereof. In one or more embodiments, the measurement and transmission from the plurality of temperature sensors 344 prevents damage to the laser head.

The plurality of temperature sensors 344 may include a first temperature sensor, a second temperature sensor, and a third temperature sensor. The first temperature sensor may be configured proximate to the laser head 312. The second temperature sensor may be configured in a central location between a laser head and the exit port 322 of the activating chamber 318. The third temperature sensor may be configured proximate to the exit port 322.

The plurality of temperature sensors 344 of the activating chamber 318 may be in electrical communication with a laser head of one or more embodiments, a surface control unit, or combinations thereof. The at least one temperature sensor 344 may transmit a temperature signal via the electrical communication to the laser head. In one or more embodiments, the transmitted temperature signal activates (or "turns on") the laser head to emit a laser energy. In one or more embodiments, the transmitted temperature signal deactivates (or "turns off") a laser energy from the laser head.

In one or more embodiments, the temperature signal transmitted from the temperature sensor 344 transmits a threshold temperature to deactivate the laser energy emitted from a laser head. The threshold temperature may in a range with a lower limit of about 850° C., about 860° C., about 870° C., about 880° C., about 890° C., about 900° C., and about 910° C. to an upper limit of about 890° C., about 900° C., about 910° C., about 920° C., about 930° C., about 940° C., and about 950° C.

The activating chamber may include one or more gas purge lines 332. The gas purge lines 332 may inject a gas into the activating chamber 318. The gas of one or more embodiments may include, but is not limited to, air, compressed air, any inert gas, such as nitrogen and/or argon, or combinations thereof. The gas purge lines 332 may be configured to inject the gas in a singular direction of the gas flow. The singular direction of the gas flow may be configured in a direction toward the exit port 322 of the activating chamber 318.

The injecting the gas into the activating chamber may pressurize the activating chamber 318 to a threshold pressure. Upon pressurizing the activating chamber 318 to the threshold pressure, a one-way valve 326 of the exit port 322 may open to release the irradiated heat transfer agent 356 from the activating chamber 318. A gas purging flow rate of the injected gas may control an amount of the irradiated heat transfer agent 356 ejected from the activating chamber.

The threshold pressure of one-way valve 326 may be pre-determined prior to introduction into a wellbore. The threshold pressure of one-way valve 326 may depend on the depth of a wellbore. For example, a wellbore of a greater depth may require a higher threshold pressure than a wellbore of shorter depth. In one or more embodiments, the threshold pressure is configured according to a pressure gradient. The pressure gradient may be 0.422 psi/ft (pounds per square inch per foot).

In one or more embodiments injecting the gas via the gas purge lines 332 occurs once the heat transfer agent 320 is irradiated by energy emitted from a laser head 312. In one or more embodiments, the irradiated heat transfer agent 356 is used to heat a fluid in a reservoir, a fluid from a fluid conduit, or combinations thereof.

As shown in FIGS. 3A and 3B, the activating chamber 318 may include a reinforced plug 324 connected to the exit port 322. In one or more embodiments, the one-way valve 326 of the exit port 322 is in fluid communication with the reinforced plug 324. In one or more embodiments, the angle between the exit port and the laser head is at an angle other than 180° (for example, 45°, 60°, 120°, 270°, or others).

The reinforced plug 324 may be configured to withstand a temperature up to about 1400° C. and a pressure up to about 4000 psi (pounds per square inch). The reinforced plug 324 may be configured to withstand a temperature up to about 1200° C. and up to about 3500 psi. The reinforced plug 324 may include at least one material that prevents a laser energy from the laser head from exiting the activating chamber. Non-limiting examples of such materials include steel and copper.

In one or more embodiments, the reinforced plug blocks laser energy from leaving the tool, provides for the containment of the heat transfer agent, provides a path to for the heat transfer agent to exit the activating chamber of the laser tool body, adds central weight to balance the laser tool body, or combinations thereof.

When the irradiated heat transfer agent 356 is ejected from the activating chamber 318 through the one-way valve 326 of the reinforced plug 324 and the exit port 322 of one or more embodiments, the irradiated heat transfer agent 356 encounters one or more fluidic components known in the art. These fluid components may include one or more components (for example, pumps, conduits, inlets, outlets, sprayers, mixers, diffusers, and throats). In one or more embodiments, the laser tool body 310 includes at least one fluid conduit 316. The at least one fluid conduit 316 includes a fluid inlet (not shown) and a fluid outlet 330.

The fluid inlet may be configured at a surface location of a reservoir. In one or more embodiments, the fluid inlet is in fluid communication with a fluid source as known to those skilled in the art. The fluid outlet 330 of the at least one fluid conduit 316 is configured proximate to the exit port 322 of the activating chamber. The fluid outlet 330 includes a fluid outlet valve configured to release a fluid (represented by arrows 350).

FIG. 3B is a cross-sectional schematic of the release of the irradiated heat transfer agent 356 from the activating chamber 318 in accordance with one or more embodiments. In one or more embodiments, the at least one fluid conduit 316 may be configured such that the irradiated heat transfer agent 356 is in fluid communication with a fluid from a fluid outlet valve 334 on the fluid outlet 330 of the fluid conduit 316 to form a heated fluid mixture 346 as shown in FIG. 3B. In one or more embodiments, the thermal energy stored in the irradiated heat transfer agent 356 is transferred to the fluid, such that it is absorbed by the fluid, and a temperature of the fluid increases.

The fluid of one or more embodiments includes an aqueous fluid. The aqueous fluid may include water. The water may be distilled water, deionized water, tap water, fresh water from surface or subsurface sources, production water, formation water, natural and synthetic brines, brackish water, natural and synthetic sea water, potable water, non-potable water, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the transfer of heat from the irradiated heat transfer agent 356. In one or more embodiments, viscosifiers, polymers, surfactants, and combinations thereof may be added to the aqueous fluid to enhance the dispersion of the heat transfer agent in the fluid. Suitable surfactants may include anionic surfactants, cationic surfactants, and zwitterionic surfactants known in the art. Non-limiting examples of viscosifiers include xanthan gum, polymers commonly used in enhanced oil recovery operations, such as AN-132, and combinations thereof.

In one or more embodiments, the nozzle 314 of the laser tool body 310 is connected to the activating chamber 318 proximate to the exit port 322. The one-way valve 326 may be configured to release the irradiated heat transfer agent 356 and connect with a fluid to form a heated fluid mixture 346 as described above.

In one or more embodiments, the nozzle 314 includes at least one additional temperature sensor 348. The at least one additional temperature sensor may be in electrical communication with a surface control unit, a laser source, a laser head of the laser tool body, or combinations thereof. The at least one additional temperature sensor 348 may measure a temperature of a fluid or a heated fluid mixture of one or more embodiments. The at least one additional temperature sensor 348 may transmit a temperature of a fluid or a heated fluid mixture of one or more embodiments to a surface control unit, a laser source, a laser head of the laser tool body, or combinations thereof.

In one or more embodiments, the heated fluid mixture 346 passes through one or more fluidic components within nozzle 314 and thus, the one or more fluidic components may control the size and direction of the heated fluid mixture 346 before or during emission from nozzle 314. In one or more embodiments, the heated fluid mixture 346 when emitted from nozzle 314 has any spray pattern (for example, a solid stream, a mist, a fog, a flat fan, a twin flat fan, a hollow cone, a solid cone, or a spiral full cone), any spray angle/geometry (for example, wide or narrow), and any spray geometry (for example, round or oval), depending upon the application. In one or more embodiments, the nozzle 314 is configured to raster the heated fluid mixture as it is emitted from nozzle 314.

Figure 4:
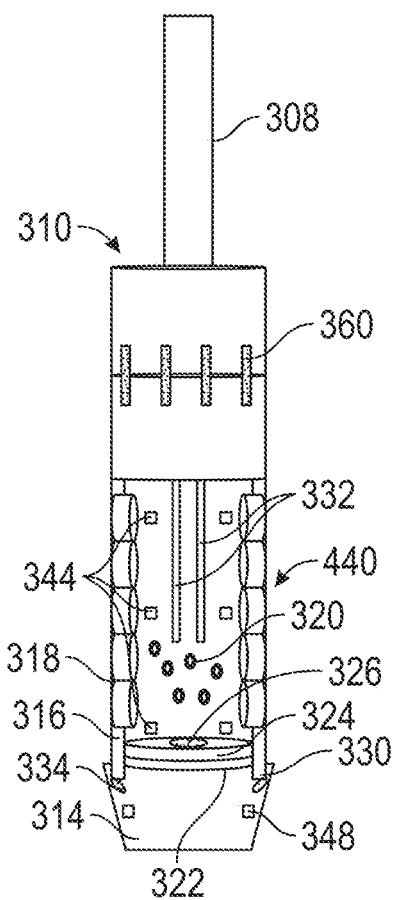
FIG. 4 is a schematic of a cross section of the laser tool body that includes a plurality of laser heads in accordance with one or more embodiments.

In one or more embodiments, the laser tool body 310 includes a plurality of laser heads 440 in the activating chamber 318 as shown in FIG. 4. As known by those skilled in the art, the plurality of laser heads 440 may be in electrical connection with the output end of the optical fiber 308 using a splitter (not shown).

Additionally, some embodiments of laser tool system may include more than one nozzle and/or more than one laser head. In one or more embodiments, each laser head, for example, a plurality of laser heads described above.

Figure 5:
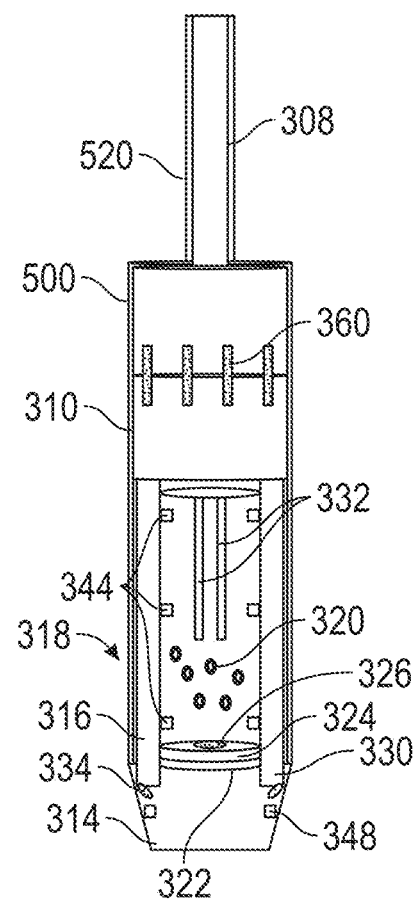
FIG. 5 is a schematic of a cross section of the laser tool body of FIG. 2 that includes a case to protect the components of the laser tool body from the environment present in wellbore in accordance with one or more embodiments.

A case 500 may protect the components of the laser tool body 310 from the environment present in wellbore as shown in FIG. 5, which displays a cross-section of the laser tool body presented in FIG. 2. Similarly, a sheath 520 protects optical fiber 308 from the environment present in a wellbore. The laser tool of one or more embodiments may include additional modules, such as a rotational module, that may be within case 500 and/or sheath 520 or may include an additional protective covering and/or coating to protect the rotational module from the environment present in a wellbore.

Method of Heating a Fluid with a Laser Tool System

Figure 6:
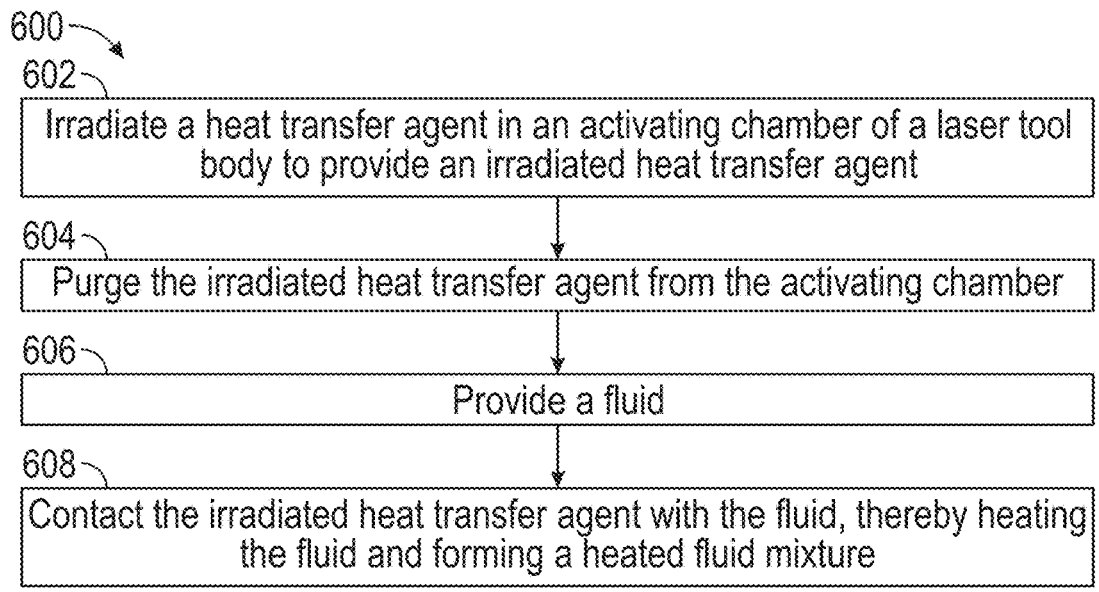
FIG. 6 is a flow chart depicting a method of heating a fluid with a laser tool system in accordance with one or more embodiments.

FIG. 6 is a flow chart depicting a method 600 of heating a fluid with a laser tool system. The laser tool system includes a laser tool body as described in embodiments above. Not all depicted blocks may be performed in all embodiments of this method.

The method 600 includes block 602 in which a heat transfer agent is irradiated in an activating chamber of the laser tool of one or more embodiments as described above. The power of the laser energy emitted, the period of time to irradiate the heat transfer agent, or combinations thereof may be controlled such that a target temperature of the irradiated heat transfer agent is achieved. The period of time to irradiate the heat transfer agent may be estimated or determined prior to irradiating the heat transfer agent. The at least one temperature sensor or the plurality of temperature sensors may transmit localized temperatures in various regions of the activating chamber as described above, such that a temperature of the heat transfer agent is controlled.

In block 604, the irradiated heat transfer agent may be purged, such that the irradiated heat transfer agent is ejected, from the activating chamber. Purging the heat transfer agent may include injecting a gas via one or more gas purge lines of the activating chamber. The gas may be an inert gas as described above.

Block 606 includes providing a fluid, such as an aqueous fluid. The irradiated heat transfer agent ejected from the activating chamber may contact the aqueous fluid (block 608), thereby heating the aqueous fluid and forming a heated fluid mixture. The heated fluid mixture may be discharged via a nozzle of the laser tool body as described above.

In one or more embodiments, block 606 may be performed prior to the irradiation of the heat transfer agent. In one or more embodiments, at least one additional temperature sensor of the nozzle transmits a temperature of the fluid via electrical connection to a surface control unit, the laser source, the laser head of the laser tool body, or combinations thereof. In one or more embodiments, the temperature of the fluid may be below a treatment temperature. The treatment temperature may be the temperature required to stimulate a target area.

Embodiments in which the treatment temperature of the fluid is below the treatment temperature includes activating the emission of laser energy of the laser head in the activating chamber, thereby, irradiating the heat transfer agent. In one or more embodiments, irradiating the heat transfer agent further includes heating the heat transfer agent to a temperature range as described above.

Method of Stimulating a Reservoir with a Laser Tool System

Figure 7:
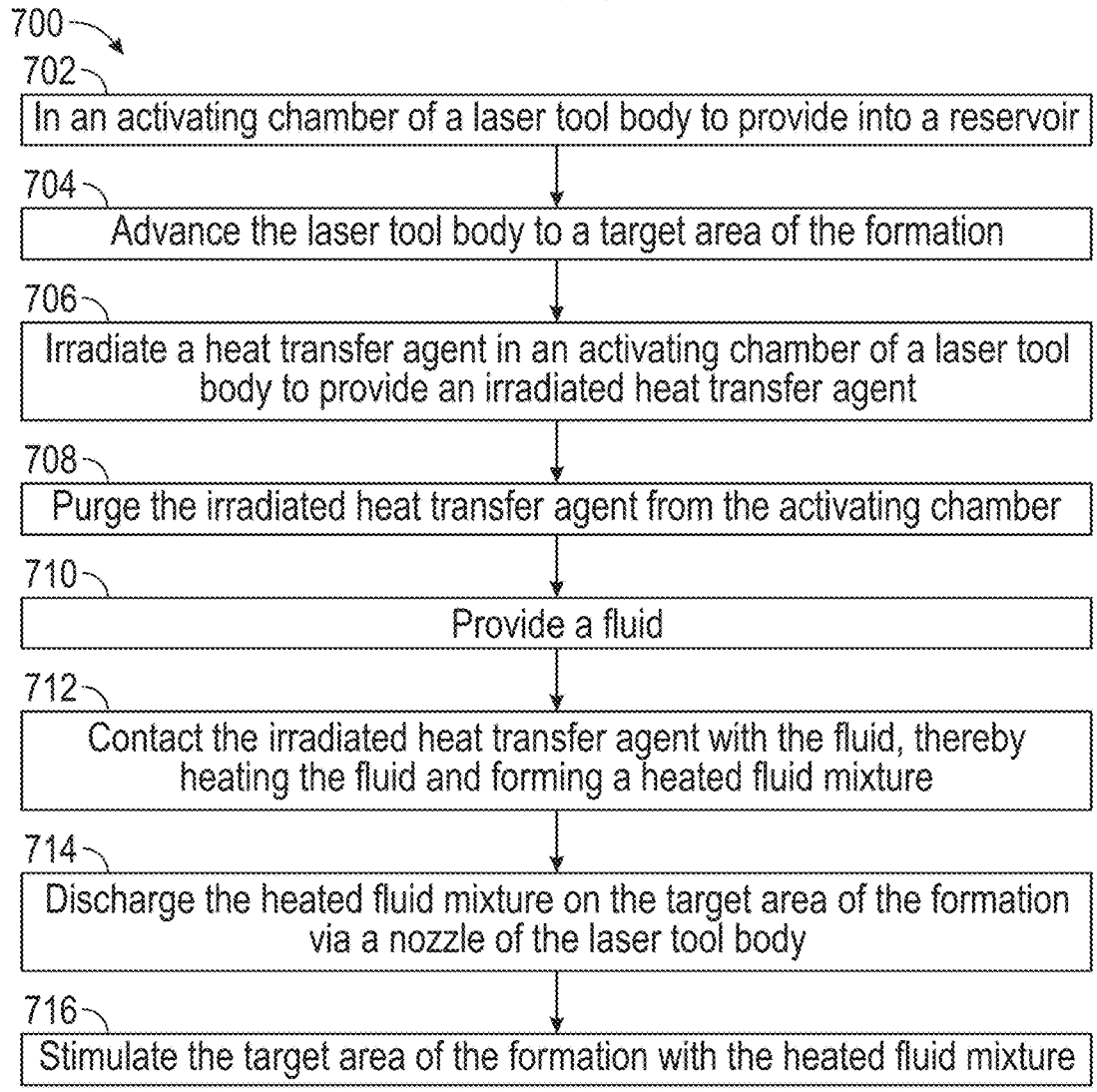
FIG. 7 is a flow chart depicting a method of stimulating a reservoir with a laser tool system in accordance with one or more embodiments.

FIG. 7 depicts a method 700 of stimulating a reservoir with a laser tool system. The method includes inserting the laser tool body into a reservoir in block 702. The laser tool body may be advanced to a target area of the formation in block 704. A heat transfer agent may then be irradiated, such that the heat transfer agent is heated, in the activating chamber of the laser tool body (block 706). The power of the laser energy emitted, the period of time to irradiate the heat transfer agent, or combinations thereof may be controlled such that a target temperature of the irradiated heat transfer agent is achieved as described above. The at least one temperature sensor or the plurality of temperature sensors may transmit localized temperatures in various regions of the activating chamber as described above.

Once a target temperature of the irradiated heat transfer agent is achieved, the irradiated heat transfer agent may be purged (block 708) from the activating chamber via the one-way valve of the reinforced plug connected to the exit port. A fluid may be provided (block 710) before, during, or after the irradiation of the heat transfer agent.

As described above, the irradiated heat transfer agent may contact the fluid in block 712 upon purging from the activating chamber. Contacting the irradiated heat transfer agent with the fluid may include heating the fluid and forming a heated fluid mixture. In block 714, the heated fluid mixture may be discharged on a target area. In one or more embodiments, the target area may be an area of a hydrocarbon-bearing reservoir, such as a wellbore. The heated fluid mixture may be discharged via a nozzle of the laser tool body. In one or more embodiments, the injection of a heated fluid mixture to the target area may stimulate the targeted treatment area (block 716) such that the stimulation enhances oil recovery, provides clean-up of a wellbore, mobilizes heavy oil and heavy oil residue, or combinations thereof.

FIGS. 8, 9A-9B, and 10A-10B depict experimental results showing irradiation impacts of a geologic limestone sample with the addition of a heat transfer agent (i.e., activated carbon). The incident beam for each experiment was a 1 kW laser and the sample was irradiated with the laser for 30 seconds.

Figure 8:
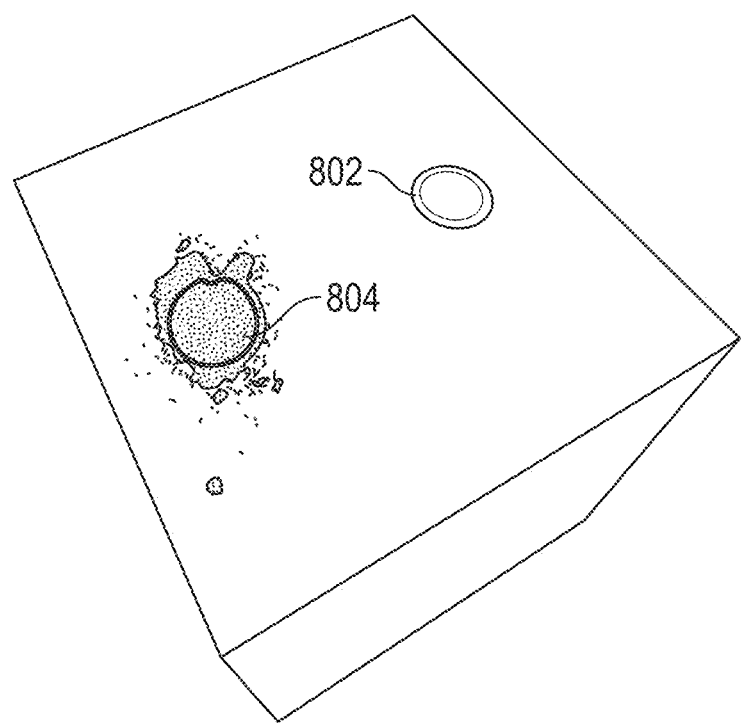
FIG. 8 depicts an exemplary design of a limestone rock sample with areas irradiated with laser energy in accordance with one or more embodiments.

FIG. 8 shows an experimental design of a limestone rock sample with areas irradiated with laser energy, with one area covered with activated carbon as a heat transfer agent and one area without a heat transfer agent. Area 804 was covered with activated carbon as the heat transfer agent, and area 802 was irradiated without heat transfer agent. As indicated the dark discoloration of area 804 indicates a larger amount of laser energy was absorbed compared to area 8.

Figure 9A:
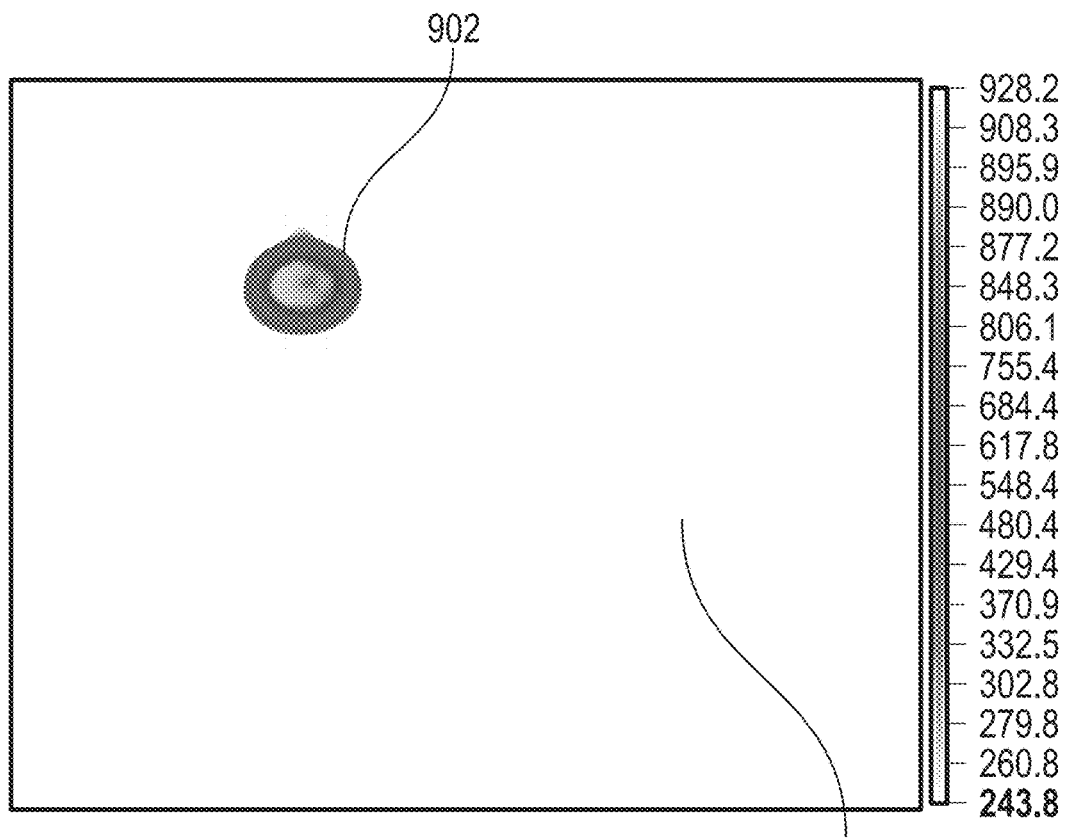
FIG. 9A depicts an exemplary contour plot showing the maximum temperature (in ° C.) for a control sample of a block of limestone irradiated without a heat transfer agent in accordance with one or more embodiments.
Figure 9B:
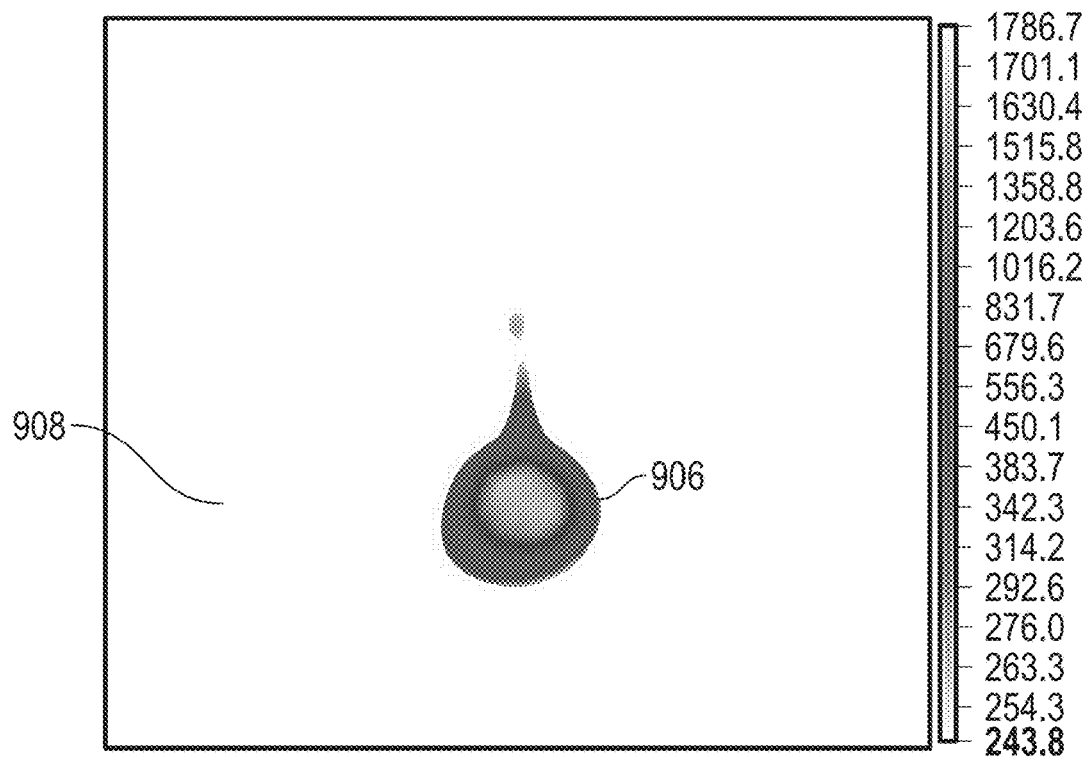
FIG. 9B depicts an exemplary contour plot showing the maximum temperature (in ° C.) for an irradiated block of limestone topped with dry activated carbon in accordance with one or more embodiments.
Figure 10A:
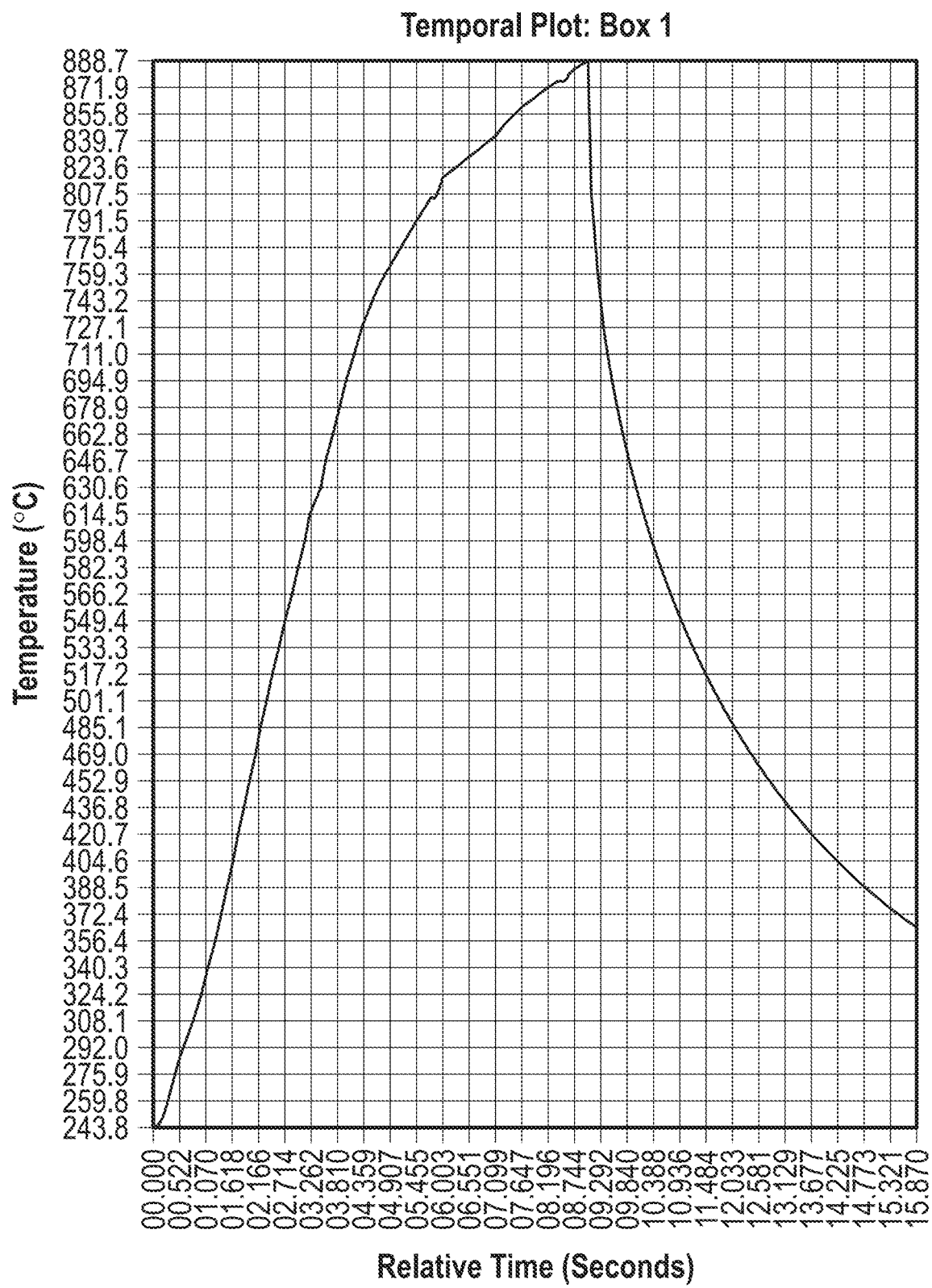
FIG. 10A is an exemplary graph of the temperature (in ° C.) as a function of elapsed time (in seconds) for a control sample of a block of limestone irradiated without a heat transfer agent in accordance with one or more embodiments.
Figure 10B:
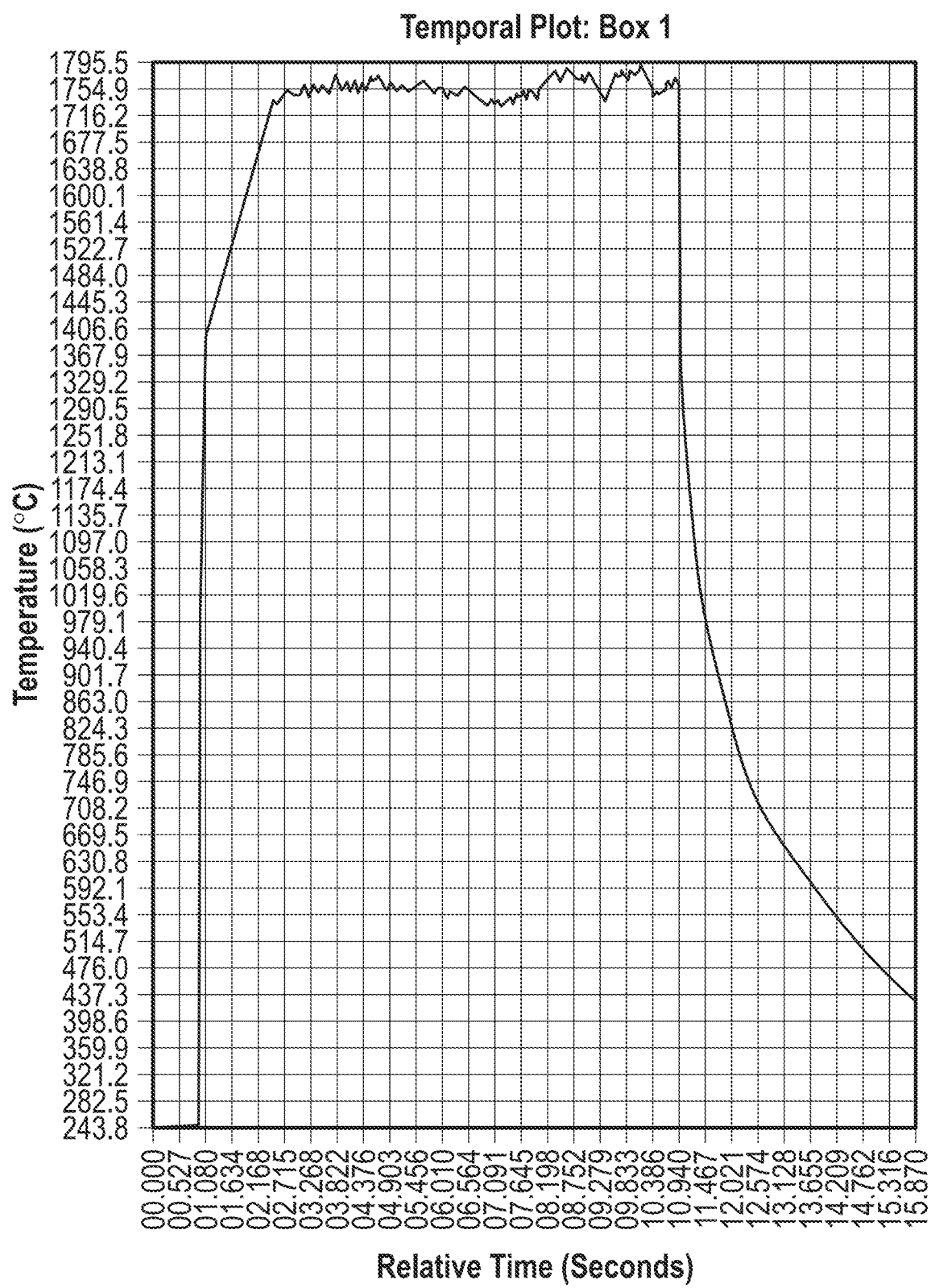
FIG. 10B is an exemplary graph of the temperature (in ° C.) as a function of elapsed time (in seconds) for an irradiated block of limestone topped with dry activated carbon agent in accordance with one or more embodiments.

FIGS. 9A and 10A reflect results of a control sample comprising a geologic sample (a block of limestone) irradiated without a heat transfer agent. FIGS. 9B and 10B reflect irradiation results of a similar block of limestone topped with dry activated carbon (the heat transfer agent).

FIGS. 9A and 9B are contour plots showing the maximum temperature (in ° C.) for each sample. An infrared camera captured the temperature of the sample including the incident spot of the laser. Areas of untreated rock sample 904 and 908 and laser heated areas 902 and 906 are indicated. Notably, area 906 of FIG. 9B indicates a higher temperature reached with activated carbon compared to area 902 of FIG. 9A, which was irradiated without activated carbon.

FIGS. 10A and 10B are graphs of the temperature (in ° C.) as a function of elapsed time (in seconds). FIGS. 10A and 10B were created using with the same infrared camera data plotted in FIGS. 9A and 9B for each sample.

As seen in FIG. 10A, the maximum temperature of the limestone control is about 888° C. Additionally, FIG. 9A shows the laser heated a smaller spatial region than seen in FIG. 10B. The maximum temperature of the limestone with the activated carbon is about 1795° C., which is more than double the maximum temperature for a sample without activated carbon as seen in FIG. 10A. Further, with activated carbon, the limestone reaches the maximum temperature in less than about 1.75 seconds, compared to about 8.75 seconds for the sample without activated carbon. Finally, after reaching the maximum temperature, the activated carbon sample essentially maintains this temperature for more than 8 second compared with less than about 0.25 seconds for the control.

The results depicted in FIGS. 9A, 9B, 10A and 10B confirm the ability of the heat transfer agent to store irradiated energy as thermal energy. Such examples indicate that activated carbon as the heat transfer agent increase the maximum rock temperature by at least about 1.75 times compared with limestone without activated carbon. Furthermore, these experiments indicate that activated carbon as a heat transfer agent can provide sufficient heat transfer to heat a fluid, such as an aqueous fluid, for a 1 kW laser, which is a much lower powered laser than is typically used for wellbore stimulation.

Embodiments of the present disclosure may provide at least one of the following advantages. As mentioned above, hot water flooding or injection often loses thermal energy during transport to target areas of formation. Embodiments of the present disclosure may provide a process to improve hot water treatment efficiency via the transfer of thermal energy from the heat transfer agent to injected fluids.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for heating an aqueous fluid via a laser tool system treatment, the method comprising:
    irradiating a heat transfer agent in an activating chamber of a laser tool system to form an irradiated heat transfer agent in the activating chamber;
    purging the irradiated heat transfer agent from the activating chamber;
    providing an aqueous fluid; and
    contacting the irradiated heat transfer agent with the aqueous fluid, thereby heating the aqueous fluid and forming a heated fluid mixture.

2. The method of claim 1, wherein the irradiating the heat transfer agent further comprises heating the heat transfer agent to a temperature range from about 300° C. to about 1200° C.

3. The method of claim 2, further comprising estimating a period of time to irradiate the heat transfer agent prior to irradiating the heat transfer agent.

4. The method of claim 1, wherein the purging the irradiated heat transfer agent further comprises injecting a gas via one or more gas purge lines of the activating chamber.

5. The method of claim 4, wherein the gas is an inert gas.

6. The method of claim 1, further comprising discharging the heated fluid mixture from a laser tool body of the laser tool system via a nozzle of the laser tool body.

7. A laser tool system treatment method for heating a fluid in a reservoir, the method comprising:
    inserting a laser tool body of the laser tool system into a reservoir;
    advancing the laser tool body to a target area of the reservoir;
    irradiating a heat transfer agent in an activating chamber of the laser tool body such that an irradiated heat transfer agent is formed in the activating chamber;
    purging the irradiated heat transfer agent from the activating chamber;
    providing the fluid;
    contacting the irradiated heat transfer agent with the fluid, thereby heating the fluid and forming a heated fluid mixture;
    discharging the heated fluid mixture on the target area of the reservoir via a nozzle of the laser tool body; and
    stimulating the target area of the reservoir with the heated fluid mixture.

8. The method of claim 7, further comprising determining a period of time to irradiate the heat transfer agent prior to irradiating the heat transfer agent.

9. The method of claim 7, wherein the irradiating the heat transfer agent further comprises heating the heat transfer agent in a range from about 300° C. to about 1200° C.

10. The method of claim 7, wherein the purging the irradiated heat transfer agent further comprises injecting a gas into the activating chamber via at least one gas purge line of the activating chamber.

11. The method of claim 7, further comprising controlling an amount of the irradiated heat transfer agent purged via a gas flow rate.

12. The method of claim 7, wherein the discharging the heated fluid mixture further comprises enhancing oil recovery, providing cleanup of a wellbore, providing cleanup of a stuck tool, mobilizing heavy oil and heavy oil residue, or combinations thereof.

* * * * *